July 30, 1929.  C. C. COLBERT ET AL  1,722,559
COATED BOARD FINISHING AND CUTTING APPARATUS
Filed Feb. 6, 1924  4 Sheets-Sheet 4

Inventors:
Charles C. Colbert.
George E. Preston.
Emery, Booth, Janney & Varney. Attys.

Patented July 30, 1929.

1,722,559

UNITED STATES PATENT OFFICE.

CHARLES C. COLBERT AND GEORGE E. PRESTON, OF ELKHART, INDIANA, ASSIGNORS TO AMERICAN COATING MILLS, OF ELKHART, INDIANA, A CORPORATION OF INDIANA.

COATED-BOARD FINISHING AND CUTTING APPARATUS.

Application filed February 6, 1924. Serial No. 690,907.

The present invention aims to provide an improved apparatus for use in the production of finished coated paper board in cut sheets.

One practicable apparatus containing an embodiment of the invention is shown for illustration in the annexed drawings, by reference to which the invention will be readily understood.

The illustrative apparatus is for finishing and cutting coated paper board for production of cut sheets as required by carton manufacturers.

A web of coated paper board undergoing treatment is designated in the drawings by the numeral 1. The direction of its travel is indicated by arrows in Figs. 2 and 7.

Finishing is effected in this instance by super-calendering to iron out the board and impart a sheen or gloss to its coated surface. A calendering machine for this purpose is designated in the drawings by the numeral 2. As will be understood by those acquainted with the art, this machine comprises steel calendering rolls 3 alternating with cotton rolls 4; these rolls bearing one upon another and frictionally driven one by another from the bottommost roll, which is power driven.

Figures 2, 3, 4, 5, 6, 7:
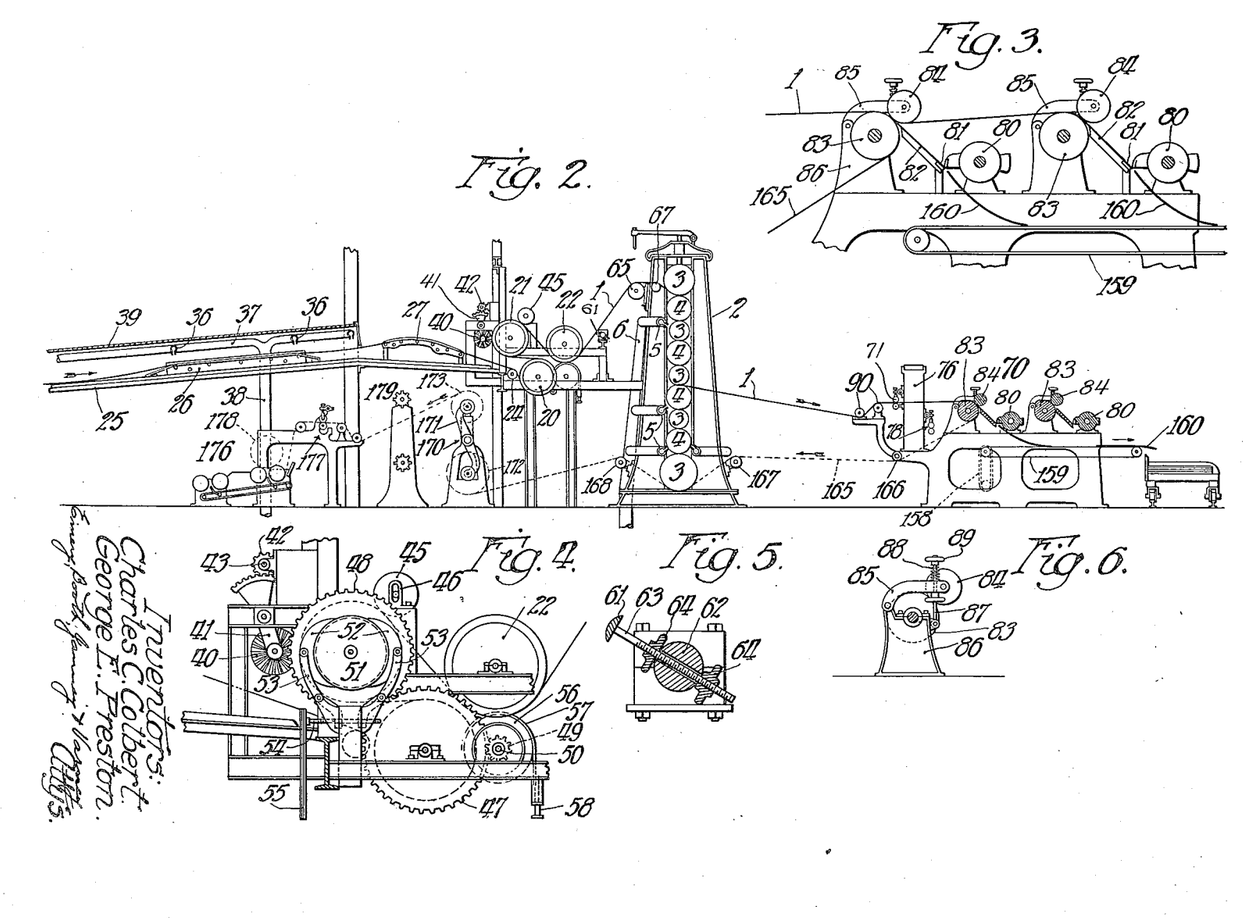
Fig. 2 is a longitudinal section thereof.
Fig. 3 is a partial sectional view of the cutting mechanism of the apparatus shown in the operation of simultaneous production of cut sheets of different lengths.
Fig. 4 is a side elevation of a web tensioning means in advance of the calendering machine of the illustrative apparatus.
Fig. 5 is a cross section of a web spreading appliance.
Fig. 6 is a detailed side elevation of feeding and tensioning rolls of the cutting machine.
Fig. 7 is a side elevation of the calendering and cutting machines and their connecting mechanism.
Figure 7:
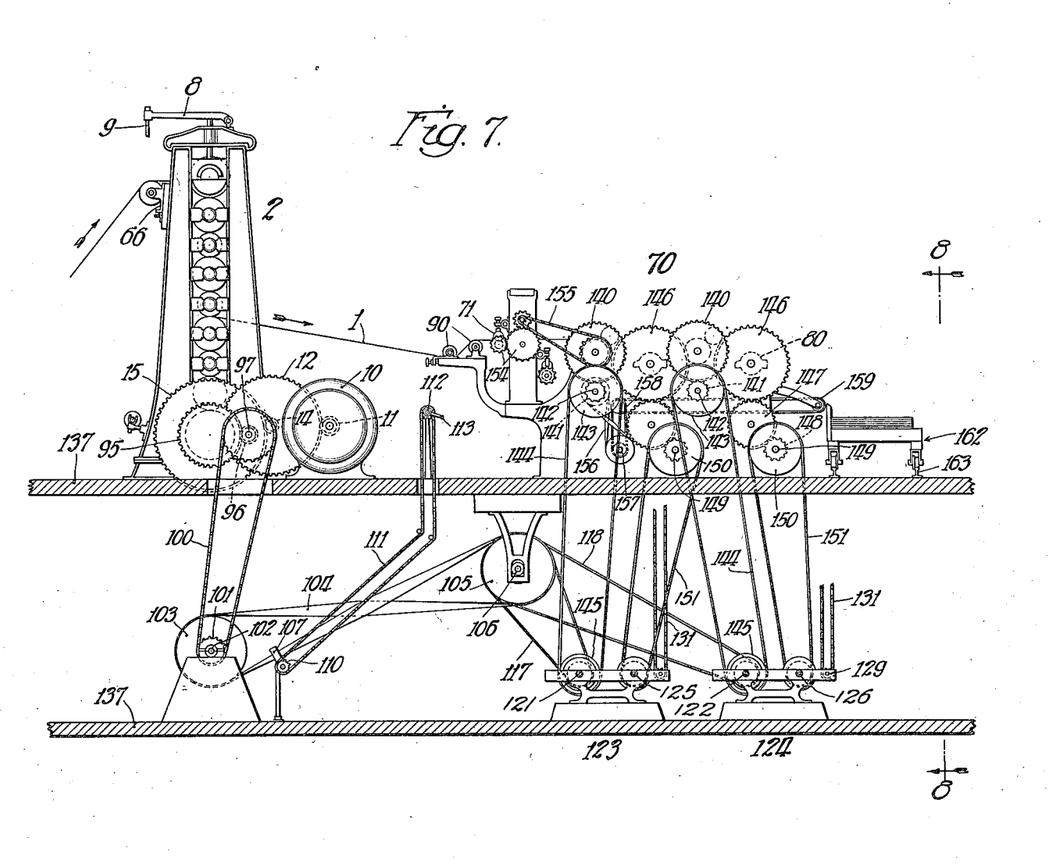

The board is threaded through the machine with its coated surface in contact with the steel calendering rolls 3 (Fig. 2). Hot air may be discharged against the back of the board and some of the cotton rolls by perforated pipes 5 connected to a pipe 6 through which the hot air may be supplied. Such application of heat promotes finishing of the board in smooth pressed condition. A desired pressure may be exerted in the calendering operation by application of a load to the uppermost calendering roll through the medium of a lever 8 connected by a rod 9 with a controllable weight applying means (not shown).

Driving means for the calendering machine is represented by a motor 10 (Fig. 1) on the shaft of which is a pinion 11 engaging a gear 12 on a countershaft 13 having a pinion 14 engaging a gear 15 on the shaft 16 of the bottom large steel roll of the calendering machine. The gears 12 and 15 are connected with their respective shafts through clutches 17 and 18 whereby said shafts may be released from the power connections when required. A gear 19 on the shaft of the bottom calendering roll may be utilized for a faster speed drive of the calendering machine from another motor (not shown) in the occasional operation of grinding the steel calender rolls.

Figure 1:
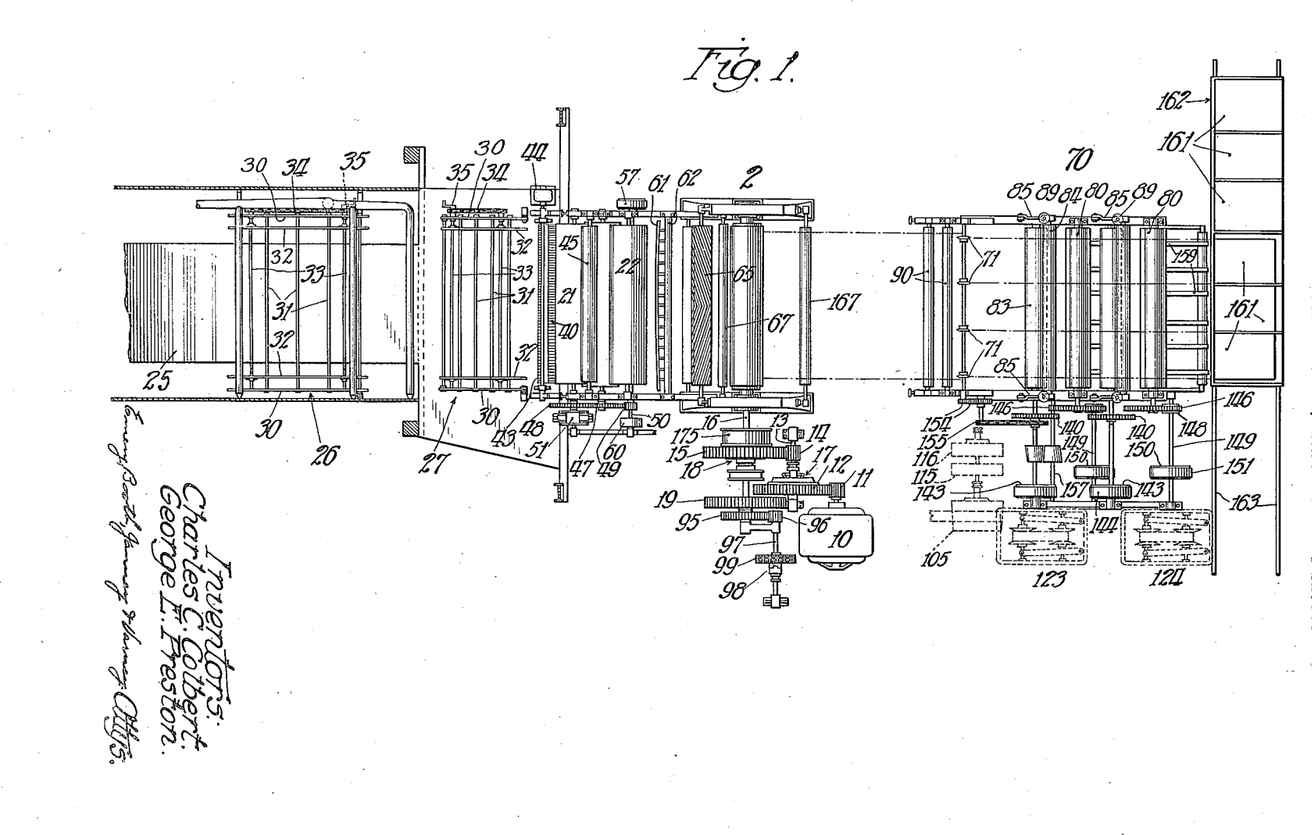
Fig. 1 is a plan view of the illustrative apparatus.

In front of the calendering machine is shown a web tensioning means represented by a number of comparatively large rolls 20, 21 and 22 entrained by and frictionally engaged by the board (Figs. 1, 2 and 4). In this instance the board is shown running over a guide roller 24 under and around the roll 20, thence backwardly and around the roll 21, and then forwardly and downwardly under the roll 22 and upwardly therefrom to the calendering machine. By this arrangement and the inertia of the tensioning rolls the board is tensioned as it is drawn into the calendering machine. Said tensioning rolls may be of wood or other appropriate material preferably surfaced with burlap to permit a frictional grip on the board.

Preceding the tensioning rolls, devices are shown for exerting a preliminary tensioning and for centering or guiding the board to maintain its longitudinal alignment.

As shown, the board is drawn over the receiving end of an elevated platform 25, then over a raised guide 26, and then over a curved guide 27 from which the board is drawn over the guide roller 24 around the roll 20. Said guides 26 and 27, in the specific construction shown, comprise supporting side bars 30 rigidly connected by transverse rods 31 which support lateral guide members 32 for engaging the edges of the board to maintain its longitudinal alignment, the board being drawn over said rods 31 between said guide members 32. These guide members are slidably mounted on the rods 31 and are simultaneously adjustable toward and away from each other by screws 33 having right and lefthand threads engaging said guide members. Said screws, rotatably but non-slidably mounted in the supporting side bars 30, are equipped with sprocket wheels engaged by chains 34 whereby the screws may be operated in unison by the crank 35 for adjusting the guide members to accommodate the particular width of board being treated.

The drag of the board over a succession of supports, and especially over the curved guide 27, develops a sufficient resistance in advance of the tensioning rolls to cause the board to be drawn in close frictional engagement with the first roll 20, and the arrangement as a whole provides for a desirable progressive tensioning of the board. Moreover if the board comes from its source of supply with any bends or irregularities, as for instance where the board is withdrawn from an accumulation of hanging festoons, the drawing of the board over said successive supports and in tensioned condition around and from the tensioning rolls, will promote effectual elimination of such irregularities. Again, if the board is drawn from a roll, the successive smoothing and tensioning influences to which it is subjected will tend to straighten the board or overcome its tendency to curve. In other words the equipment preceding the calendering rolls cooperates therewith in advantageously reducing the board to smooth flat condition for the ensuing operation of subdivision of the board into cut sheets.

Above the platform 25 and guide 26 are shown perforated pipes 36 (Fig. 2) for discharging hot air upon the coated side of the board, for a drying effect, or for an additional or super-drying action where the board is drawn from a preceding drier, and for advantageously heating the board to promote smoothing in its drag over the guides and to promote fine finishing of its coated surface. Said pipes 36 are shown connected by pipes 37 with the hot air supply pipes 38.

any dust or to contribute a polishing effect or both. This brush may be carried by lever arms 41 having toothed segments engaged by pinions 42 on an adjusting shaft 43 to permit applying the brush or adjusting it to and fro as required. The brush may be driven by a small motor 44 on the brush shaft (Fig. 1).

An iron cloth-covered press roll 45 is shown bearing on the roll 21 just in advance of the point where the board leaves the latter. This roll 45, pressing the board against the roll 21, contributes toward smoothing effects and otherwise enhances the efficiency of the tensioning mechanism. Vertical play of said press roll 45 is permitted by mounting its journal in vertically slotted bearings 46 (Fig. 4). One of said bearings is longitudinally adjustable for aligning said press roll to assist in maintaining accurate longitudinal alignment of the board. Provision for such adjustment may be made in any appropriate manner, as for instance by employing a sliding bearing member and an adjusting screw therefor (not shown).

The tensioning roll 22, from which the board is drawn to the calendering machine, is likewise axially adjustable to ensure accurate alignment of the board. For this purpose, provision may be made for adjustment of one or both of the journal bearings of said roll in the same manner as for the press roll 45.

Assuming the board to be drawn in a substantially tense state from the tensioning rolls, it will be understood that, if the board should display any tendency to run at a bias, such tendency may be corrected by slight axial adjustment of the roll 22, or by adjustment of the press roll 45, or by adjustment of both said rolls.

Associated with the tensioning rolls 20 and 21 is a braking means for frictionally retarding their rotation to increase the tensioning. As shown in Figs. 1 and 4, said rolls are equipped with intermeshing gears 47 and 48, and the gear 47 is engaged by a pinion 49 on a shaft 50. The specific braking means shown include a brake for the geared roll 21 and also a brake for the shaft 50 in gear with said rolls. The first mentioned brake (Figs. 1 and 4) comprises a brake wheel 51 and coacting brake shoes 52 carried by brake levers 53 which may be simultaneously operated to apply or release the brake shoes by right and lefthand threaded screw 54 operated by a sprocket chain 55. The brake on the shaft 50 comprises a brake wheel 56 (Figs. 1 and 4) and a cooperating strap 57 affixed at one end to the machine frame and having its other end provided with a screw engaged by an adjusting nut 58 (Fig. 4), whereby said strap The board must be run true and evenly through the calendering rolls in order to avoid creasing of the board or wrinkling of its surface in the calendering operation. It is accordingly important to have the board properly tensioned and aligned. Under certain conditions of manufacture, as for instance where the board is drawn from hanging folds in a drying room or otherwise under conditions tending to promote irregularities in its trend, the board should be drawn perfectly tense as it enters the calendering rolls. This may be efficiently and conveniently accomplished by the tensioning means described.

The intergeared tensioning rolls 20 and 21 may be initially power driven to draw the board from its source of supply in the initial operation of threading the board through the apparatus. For this purpose the shaft 50 is shown equipped with a pulley 60 (Fig. 1) to permit a belt drive from appropriate mechanism. It will be understood that after the board is threaded through the calendering machine, the power is disconnected, by any appropriate clutch, and thereafter the tensioning rolls are rotated only through the medium of the board entrained about said rolls.

Beyond the tensioning rolls is shown a web spreading appliance comprising a rounded steel bar 61 bearing against the back or under side of the board and adapted to be bowed for exerting a spreading action on the board so as to distribute the tension transversely. This spreader bar may be connected with its supporting bar 62 by individually adjustable screws 63 for flexing or bowing the spreader bar as required. As shown in Fig. 5, the screws 63 may pass loosely through the supporting bars 62 and be secured thereto by nuts 64 which may be turned to adjust the screws.

The board is shown being drawn into the calendering machine over a guide roller 65 provided with oblique ribs disposed symmetrically with reference to the middle of the guide roller and arranged to exert a spreading action on the board. The bearings for said roller may be carried in vertically adjustable bearing brackets 66 provided with adjusting screws for aligning said roller. Just beyond said guide roller 65 is shown a small guide roller 67. The latter may if desired be held stationary to supply increased frictional resistance and smoothing action to the passage of the board.

It will be seen that the board is prepared for cut sheet production in a highly advantageous manner, being subjected to successive smoothing and tensioning actions and finished or calendered under conditions minimizing tendencies to injure the product by creasing or wrinkling, and insuring delivery of the board for subdivision in a smooth flat web.

From the calendering machine the board is drawn into a cutting machine 70 which subdivides the board, delivering the finished product in cut sheets.

Figures 8, 10, 11:
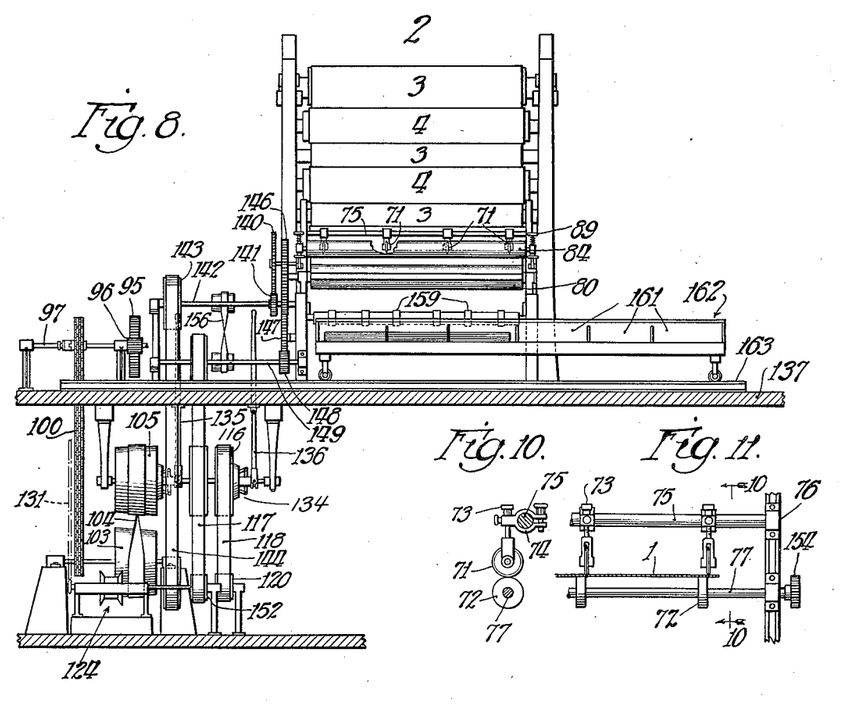
Fig. 8 is a rear end view of the subject matter of Fig. 7.
Figs. 10 and 11 are side and front views of a portion of the trimming and slitting means of the cutting machine.

The illustrative cutting machine has at its receiving end a number of parallel rotary cutter discs 71 for trimming the edges of the board and slitting or cutting it longitudinally. As shown more clearly in Figs. 10 and 11, the discs 71 coact with rollers 72 which hold the board against the cutter discs. Said cutter discs are vertically adjustable by nuts 73 engaging threaded shanks of the disc holders, which are secured by brackets 74 to a transverse supporting rod 75 bracketed to standards 76 (Figs. 2 and 8). It will be understood that these cutter discs and the rollers 72 associated therewith may be adjusted for lateral spacing as desired. Said rollers 72 are mounted on a power-driven shaft 77 which is also bracketed to said standards 76.

A duplicate set of slitter discs and coacting devices is indicated at 78 in Fig. 2. This set, mounted on the rear sides of the standards 76, is shown lowered to an inoperative position. The supporting brackets for each set are vertically slidable on to standards, to permit raising or lowering them, and either set may be used, so as to avoid delays during sharpening of the slitter discs.

For cutting the board transversely, the illustrative cutting machine is shown equipped with a pair of revolving cutters 80, arranged one behind another, either or both of which may be used. The knives of these revolving cutters coact with stationary bed knives or cutter bars 81 at the lower ends of the inclined supports 82 over which the board runs to said cutters.

In Fig. 1, the board is represented as being divided by the cutter discs 71 into three longitudinal sections. All of these sections may be run to either of the cutters 80, for cutting them into sheets of equal lengths; or certain of said sections may be operated upon by one of said cutters while the remaining section or sections may be passed to the other cutter for cutting into sheets of different length. Fig. 3 represents such an operation.

The lengths of the cut sheets will depend upon the speed of rotation of the cutters 80, which may be adjusted as required by means hereinafter referred to. The widths of the sheets will be determined by the number and spacing of the cutter discs 71; so that the machine is adjustable for production of the cut sheets of finished board in any desired dimensions within the limits allowed by the machine.

The board is drawn into the cutting machine by coacting rolls. In this instance the machine is provided with two sets of coacting draw rolls 83 and 84, one set for each of the rotating cutters 80, whereby the board or sections thereof may be fed over the respective supports 82 to the action of either or both of the cutters 80, as will be understood by reference to Figs. 2 and 3. The lower draw rolls 83 are power driven, while the coacting draw rolls 84, which are preferably cloth-covered, bear on the lower rolls to grip the board. As shown more clearly in Figs. 3 and 6, said upper rolls 84 are carried by lever arms 85 pivoted to the bearing standards 86 of the lower draw rolls 83. The upper or press rolls 84 are held against the lower rolls 83 with a yielding pressure by means such as represented in Fig. 6, where 87 denotes a link pivoted to the standard 86 and passing through the lever arm 85, and 88 denotes a stout coiled spring enclosing said link and bearing upon the upper side of said lever arm, said spring being compressed between said lever arm and an adjusting nut 89 screwed upon the upper threaded end of said link, whereby the compression of the spring may be adjusted to increase the pressure between the draw rolls as required. Additional press rolls may if desired be provided to bear on the lower draw rolls in advance of the coacting rolls 84.

At the receiving end of the cutting machine, in advance of the slitting discs 71, the board is shown trained in engagement with rolls 90 to ensure adequate tensioning between the calendering machine and the draw rolls of the cutting machine. One or both of said rolls may be adjustable for tightening or stretching the board.

The board should be drawn to the cutting machine without fluctuation in tensioning, and without slippage in the draw rolls, to avoid any abrasion of the finished coated surface of the board. This requires the draw rolls of the cutting machine to be operated in exact synchronism with the calendering machine and at a speed to draw the board at the same rate at which it is delivered from the calendering rolls, or at a speed so slightly in excess thereof as to compensate for any slacking tendency and to maintain the board taut. For example, assuming the board to be delivered at the rate of one yard per second from the calendering rolls, and to have a tendency to elongate one hundredths of an inch per yard by the calendering and drawing out action, the draw rolls of the cutting machine should be rotated at a peripheral speed to draw the board at a rate of one yard plus one hundredth of an inch per second in order to maintain the board taut and to draw it at a rate precisely proportional to its rate of delivery from the calendering rolls. The revolving cutters 80 should also operate in synchronism with the draw rolls, to ensure production of cut sheets of uniform lengths; the speed of revolution of said cutters being adjustable to regulate the lengths of the cut sheets.

For operating the cutting machine in synchronism with the calendering machine, under the speed conditions desired, the following described mechanism is shown in the drawings, referring particularly to Figs. 1, 7, 8 and 9.

Figure 9:
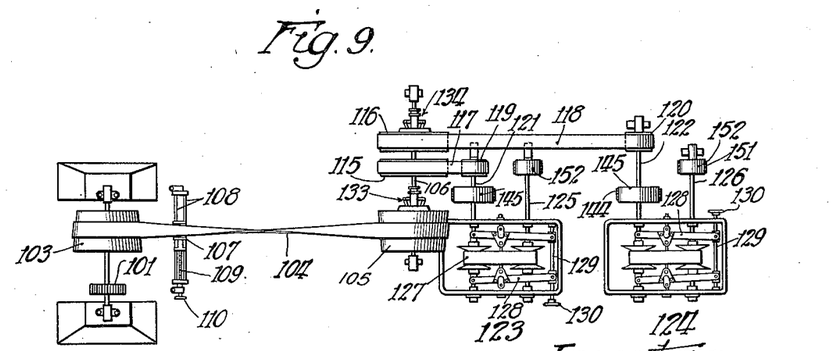
Fig. 9 is a plan view of driving mechanism between the calendering and cutting machines.

On the shaft 16 of the bottom calendar roll is a gear 95 engaging a pinion 96 on a countershaft 97, which is thereby driven from said shaft 16 (Figs. 1 and 8). On said countershaft 97, and connected therewith by a clutch 98, is a sprocket wheel 99 connected by the sprocket chain 100 with a sprocket wheel 101 on a shaft 102 in the basement of the plant (Figs. 7, 8 and 9). Said shaft 102 is equipped with a cone pulley 103 connected by the crossed belt 104 with a cone pulley 105 on a shaft 106. It will be understood that the pulley 105 is driven by the belt 104 from the pulley 103, the shaft of which is driven from the calendering machine by the transmission means referred to. The belt 104 is engaged by belt shifter 107. This belt shifter 107, slidably mounted on a support 108, may be adjusted transversely to shift the belt for adjusting the speed of rotation of the driven pulley 105 and shaft 106 as required. Said belt shifter may be operated by a screw 109, shown equipped with a sprocket wheel 110 engaged by the sprocket chain 111 (Fig. 7), running from a sprocket wheel 112 located above the floor of the plant and equipped with a crank 113, whereby the operator observing the action of the cutting machine may shift the belt 104 for speed adjustment purposes as demanded.

The shaft 106 is equipped with pulleys 115 and 116 connected by belts 117 and 118 with pulleys 119 and 120 on the drive shafts 121 and 122 of two Reeves variable speed transmission mechanisms 123 and 124. The driven shafts of said mechanisms are respectively designated 125 and 126. It will be understood that the driving and driven shafts of these Reeves mechanisms are connected by cone pulleys and belts 127 (Fig. 9), said connecting means being adjustable by the levers 128, controlled by adjusting screws 129, for effecting desired speed adjustments between the drive shafts 121, 122 and the respective driven shafts 125, 126. As shown in Figs. 7 and 9, the adjusting screws 129 of said Reeves mechanisms may be equipped with sprocket wheels 130 connected by sprocket chains 131 with sprocket wheels (not shown) conveniently located above the floor of the plant, whereby the said Reeves mechanisms, as well as the variable speed belt drive between the pulleys 103 and 105, may be adjusted by the attendant at the machine.

In Figs. 8 and 9, clutches 133 and 134 are shown for connecting the pulleys 105 and 116 with their respective shafts, these clutches being controlled by levers 135 and 136 projecting above the floor 137 of the plant. By throwing in the previously mentioned clutch 98 for the sprocket-wheel 99 (Fig. 1) and the clutch 133 for the pulley 105, the driving mechanism for the cutting machine may be operatively connected with the calendering machine; and by throwing in the clutch 134 for the pulley 116 the second Reeves mechanism 124 is connected in said drive.

Each of said Reeves mechanisms is utilized to operate one set of draw rolls and one of the revolving cutters 80 of the duplex cutting machine. The driving connections for this purpose shown in the drawings are as follows: The lower draw rolls 83 of the cutting machine are driven by gears 140, 141, from counter-shafts 142, on which are pulleys 143 driven by belts 144 from pulleys 145 on the drive shafts of the respective Reeves mechanisms. The revolving cutters 80 are driven by gears 146, 147, 148 from counter-shafts 149 on which are pulleys 150 driven by belts 151 from pulleys 152 on the driven shafts of said Reeves mechanisms.

The mechanism at the receiving end of the cutting machine for trimming and slitting the board longitudinally may be driven by a train of gears 154 which are driven by the chain 155 from the shaft of the foremost draw roll (Fig. 7).

In Figs. 7 and 8, the counter-shaft 142 associated with the foremost draw roll of the cutting machine is shown connected by a crossed belt 156 with a shaft 157, which by means of a chain 158 drives an endless conveyor 159 to receive and discharge the cut sheets of board. Said crossed belt 156 may engage cone pulleys on the respective shafts 142 and 157, to permit of speed adjustment of the conveyor.

From the foregoing description, it will be seen that the two sets of coacting draw rolls of the cutting machine are driven from the drive shafts of the respective Reeves transmission mechanism 125 and 126, which in turn are belt driven from a variable speed mechanism, comprising the cone pulleys 103 and 105 connected by the crossed belt 104, driven directly from the bottommost large steel roll of the calendering machine; while the cutters 80 are driven through said Reeves mechanisms from the driven shafts thereof. This construction permits of the delicate speed adjustments demanded, whereby the cutting machine may operate in synchronism with the calendering machine, with its draw rolls speeded to draw the board under constant tensioning at a rate always commensurate with the rate of delivery from the calendering rolls, and with the revolving cutters operating in any desired speed relation to the rate of travel of the board for cutting sheets of desired lengths, always uniformly.

It will be understood that the tension on the reach of the board web between the calender rolls and the draw rolls of the cutting machine may be regulated by the operator under the guise of speed adjustment in the drive to the cutting machine. A belt drive properly designed to transmit power efficiently is normally subject to a small percentage of slippage. In this instance there are three belts in series for driving the drawing rolls of the cutting machine. The total slippage in this drive is greatly in excess of the slight elongation of the paper web in passing between the calenders and draw rolls of the cutting machine. By a slight adjustment of the relative speed connection between the calendering and cutting machines, the tension of the belts and the amount of slippage may be increased, with corresponding increase in the tension on the web between the two devices; it being understood that the belt tension and amount of slip will change in proportion to load on the cutting machine by reason of the tension in the board web.

The cut sheets 160 drop upon the conveyor 159 (Figs. 2 and 3) and are delivered into compartments 161 of a truck 162 running on a track 163 extending across the delivery end of the cutting machine (Figs. 1 and 8). The illustrative cutting machine is arranged for delivering three cut sheets at a time. Accordingly the truck 162 has six compartments. In the position of the truck shown in the drawings, three of these compartments are receiving the cut sheets. When these compartments are filled, the truck may be moved to bring the other three compartments into receiving position, while the sheets may be removed from the other displaced compartments for packaging and shipment.

By use of the apparatus and mode of treatment described, the manufacturing operation of producing finished coated paper board in cut sheets may be conducted in a highly efficient and advantageous manner, under conditions minimizing tendencies to damage the product either in the calendering or cutting operations, and with important economies of time and labor.

In some instances, to comply with special trade requirements, it may be desired to put up finished board in rolls; and the illustrative apparatus includes a means whereby this may be done conveniently simultaneously with the production of cut sheets. For this purpose, the board having been longitudinally slitted in sections of desired widths, a section to be packaged in rolls may be passed around and under the foremost draw roll 83 and drawn backward therefrom to reeling mechanism, while the remaining section or sections may be passed through the cutting machine for subdivision in cut sheets. This operation is represented in Fig. 2, where a section of board 165, indicated by dotted lines, is shown being drawn backwardly under a guide roller 166, thence over a guide roller 167, under the bottom calender roll, and over a guide roller 168, and thence to a reeling machine 170.

The specific reeling machine 170 shown in the drawings is of the type having a pivoted invertible support 171 for two reel-cores, so that after reeling one roll of board the support may be inverted to bring the other reel into play, while the board may be withdrawn from the previously completed roll for trimming and re-reeling. As shown in Fig. 2, a roll 172 is being reeled, while board is being withdrawn from a previously reeled roll 173. The reeling machine may be driven by any appropriate means (not shown) from a pulley 175 on the shaft of the bottom calender roll (Fig. 1).

A re-reeling machine is indicated at 176, and its tensioning and edge trimming mechanism is indicated as a whole at 177. A roll of board in the re-reeling machine is indicated at 178. Between the reeling machine 170 and the re-reeling machine 176 is shown a reeling machine 179 on which the board may, if desired, be re-wound from the reeling machine 170 with its coated side out instead of in, and then re-reeled accordingly on the machine 176. These machines, as well as the reeling machine 170, are of standard character and require no further specific description.

It will be observed that the elevated position of the platform 25, guides 26 and 27, and tensioning rolls 20, 21 and 22, provides a subjacent clear floor space utilized to receive the reeling and re-reeling machinery, with the advantage of compactness of arrangement.

Obviously the present invention is not restricted to the precise details of construction, arrangement and mode of operation of the illustrative apparatus, since the same may be variously modified to suit different conditions and requirements. Moreover it is not indispensable that all the features of the invention to be used conjointly, since they may advantageously be used in various different combinations and sub-combinations.

What we claim is:

1. An apparatus of the class described comprising, in combination, a continuously operating web-subdividing machine comprising web-drawing means and cutter mechanism for subdividing the web into flat sheets; and preceding means through which the web is drawn including guiding means engaging the longitudinal edges of the web for aligning the web and a plurality of devices arranged between said guiding means and the subdividing machine for imposing successive smoothing and tensioning actions on the web to prepare it for cut sheet production.

2. An apparatus of the class described comprising, in combination, a continuously operating web-subdividing machine comprising web-drawing means and cutter mechanism for subdividing the web into flat sheets; a preceding guide through which the web is drawn; means associated with said guide comprising transverse rods over which the web is drawn; and web-tensioning and smoothing means between said guide and subdividing machine.

3. An apparatus of the class described comprising, in combination, a continuously operating web-subdividing machine comprising web-drawing means and cutter mechanism for subdividing the web into flat sheets; and preceding web-tensioning means comprising a plurality of rollers entrained by the web, and rotated against their own inertia by the web as it is drawn to the subdividing machine.

4. An apparatus of the class described comprising, in combination, a continuously operating web-subdividing machine comprising web-drawing means and cutter mechanism for subdividing the web into flat sheets; and preceding web-tensioning means comprising a plurality of rollers entrained by the web and rotated against their own inertia by the web as it is drawn to the subdividing machine, and associated braking means for imposing frictional resistance to rotation of such rollers.

5. An apparatus of the class described comprising, in combination, a continuously operating web-subdividing machine comprising web-drawing means and cutter mechanism for subdividing the web into flat sheets; preceding web-tensioning rollers around which the web is drawn; and means from which the web is drawn to said rollers providing surfaces in rubbing engagement therewith for exerting a frictional drag on the web.

6. An apparatus of the class described comprising, in combination, a continuously operating web-subdividing machine comprising web-drawing means and cutter mechanism for subdividing the web into flat sheets; preceding web-tensioning means; and means for applying a finishing action on the web as it is drawn tense from the web tensioning means to the subdividing machine.

7. An apparatus of the class described comprising, in combination, a calendering machine; means for aligning and progressively tensioning the web undergoing treatment as it is drawn from its source of supply to said calendering machine; and a cutting machine comprising means for drawing the web from the calendering machine under tension and cutting mechanism, said cutting machine driven from and in synchronism with said calendering machine.

8. An apparatus of the class described comprising, in combination, a calendering machine; preceding web tensioning means; and a succeeding cutting machine driven from and synchronously with the calendering machine, said cutting machine comprising means for cutting the web into sheets and having means for drawing the web to said cutting means with a substantially non-fluctuating tension.

9. An apparatus of the class described comprising, in combination, a calendering machine; preceding web-aligning and tensioning means including cylinders entrained by the web and from which the web is drawn tense to the calendering machine; mechanism drawing the web taut from the calendering machine and which cuts the web into flat sheets; and means for driving said mechanism from and in synchronism with said calendering machine.

10. An apparatus of the class described comprising, in combination, a calendering machine; a subdividing machine which draws the web from the calendering machine, said subdividing machine comprising draw rolls and cutter mechanism; means for operating said draw rolls from and synchronously with the calendering machine at a speed to draw the web at a rate commensurate with its delivery from the calendering machine; and means for operating said cutter mechanism with desired speed adjustment through the mechanism for operating said draw rolls.

11. An apparatus of the class described comprising, in combination, a calendering machine; a succeeding continuously operating cutting machine for drawing a web taut from said calendering machine and cutting it into sheets; driving means for said calendering machine; means including a variable speed mechanism for operating said cutting machine from said calendering machine; and means for adjusting said variable speed mechanism while in motion.

12. An apparatus of the class described comprising, in combination, a calendering machine; a succeeding continuously operating cutting machine; driving means for said calendering machine; means including variable speed mechanism for operating said cutting machine from said calendering machine; and means operable within reach of the operator observing said calendering and cutting machines for adjusting said variable speed mechanism while said machines are in motion.

13. An apparatus of the class described comprising, in combination, a calendering machine; a succeeding cutting machine which draws the web from the calendering machine, said cutting machine including web cutting means; driving mechanism for said calendering machine; means including a variable speed mechanism for operating said cutting machine from said calendering machine; and variable speed means operated from said last-named means for operating the web cutting means of said cutting machine.

14. An apparatus of the class described comprising, in combination, a stack of calendering rolls; a driving means therefor; driven mechanism connected with the bottom-most calendering roll; means operated by said last-named mechanism for drawing the web from said calendering rolls under tension at a uniform speed commensurate with the rate of delivery of the web from said calendering rolls; and web cutting means operating synchronously with said last-named means.

15. An apparatus of the class described comprising, in combination, a stack of calendering rolls; driving means therefor; transmission means including a variable speed mechanism driven from the bottommost calendering roll; and Reeves transmission mechanism driven from said last-mentioned mechanism; a cutting machine which draws the web from the calendering rolls; the web drawing means of said cutting machine being driven from the drive shaft of said Reeves mechanism; and the cutting means of said cutting machine being driven from the driven shaft of said Reeves mechanism.

16. An apparatus of the class described comprising, in combination, a calendering machine; driving means therefor; transmission mechanism driven from the bottommost calender roll, including a variable speed mechanism; a plurality of Reeves transmission mechanisms driven from said last-mentioned mechanism; and a duplex cutting machine comprising draw rolls driven from the drive shafts of said Reeves mechanisms and cutters driven from the driven shafts of said Reeves mechanisms.

17. An apparatus of the class described comprising, in combination, a calendering machine; and synchronously operating means for drawing the web with a non-fluctuating tension from said calendering means and subdividing the web into cut sheets.

18. An apparatus of the class described comprising, in combination, web-calendering means; preceding web-tensioning means; means for drawing the web from said calendering means with a non-fluctuating tension; and web-subdividing means operating synchronously with said calendering means.

19. An apparatus of the class described comprising, in combination, a plurality of means through which the web is drawn; certain of said means providing surfaces in rubbing engagement with the web; certain of said means having provision for aligning the web; a continuously operating web sub-dividing machine having means for drawing the web thereto in tense condition; and means arranged between said first mentioned plurality of means and said sub-dividing machine for applying a finishing action on the web while it is being drawn tense in its travel to the sub-dividing machine.

20. An apparatus of the class described comprising, in combination, web tensioning means through which the web is drawn, including a roll entrained by the web; means for frictionally retarding the rotation of said roll; means for finishing the web as it is drawn taut beyond said first mentioned means; and a continuously operating sub-dividing machine having means for drawing the web in tense condition thereto.

21. An apparatus of the class described comprising, in combination, means for operating on a web; a second means for withdrawing said web taut from said first means and operating thereon to subdivide the same into flat sheets; and a power drive from said first to said second means including transmission elements normally subject to material slippage; said transmission including a change speed mechanism as a part thereof.

22. An apparatus of the class described comprising, in combination, means for operating on a web; a second means for withdrawing said web taut from said first means and operating thereon to subdivide the same into flat sheets; and a power drive from said first to said second means including transmission elements normally subject to material slippage; said transmission including change speed mechanism capable of adjustment through small increments.

23. An apparatus of the class described comprising, in combination, means for operating on a web; a second means for withdrawing said web taut from said first means and operating thereon to subdivide the same into flat sheets; a power drive from said first to said second means including transmission elements normally subject to material slippage; and means for adjusting the tension of the reach of web between said first and second operating means.

24. An apparatus of the class described comprising, in combination, means for operating on a web; a second means for withdrawing said web taut from said first means and operating thereon to subdivide the same into flat sheets; and a power drive from said first to said second means including transmission elements normally subject to material slippage; said transmission automatically maintaining a substantially constant tension on the reach of web between said first and second operating means.

25. An apparatus of the class described comprising, in combination, means for operating on a web; a second means for withdrawing said web taut from said first means and operating thereon to subdivide the same into flat sheets; a power drive from said first to said second means including transmission elements normally subject to material slippage; and means for adjusting the tension of the reach of web between the first and second operating means comprising a speed change mechanism forming part of said transmission.

26. An apparatus of the class described comprising, in combination, means for operating on a web; a second means for withdrawing said web taut from said first means and operating thereon to subdivide the same into flat sheets; and a power drive from said first to said second means including transmission elements normally subject to material slippage.

27. An apparatus of the class described comprising, in combination, means for operating on a web; a second means for withdrawing said web taut from said first means and operating thereon to subdivide the same into flat sheets; and a power drive from said first to said second means including transmission elements normally subject to material slippage, said second means including change speed mechanism interpolated between its withdrawing mechanism and its subdividing mechanism.

28. An apparatus of the class described comprising, in combination, means for operating on a web; means for withdrawing said web taut from said first means; subdividing means for operating on said withdrawn web to subdivide the same into flat sheets; and means for varying the relative speeds of said withdrawing and subdividing means.

29. An apparatus of the class described comprising, in combination, web-finishing means; longitudinal cutting means for subdividing said web longitudinally; means for transversely cutting the resulting longitudinal portions of said web to divide them into flat sheets; and means for drawing said web under constant tension from said finishing means past said longitudinal cutting means.

30. An apparatus of the class described comprising, in combination, web-finishing means; longitudinal cutting means for subdividing said web longitudinally; means for transversely cutting the resulting longitudinal portions of said web to divide them into flat sheets; and means for drawing said web under high and constant tension from said finishing means past said longitudinal cutting means.

31. An apparatus of the class described comprising, in combination, web-finishing means; longitudinal cutting means for subdividing said web longitudinally; means for transversely cutting the resulting longitudinal portions of said web to divide them into flat sheets; and means for drawing said web under high tension from said finishing means past said longitudinal cutting means.

32. An apparatus of the class described comprising, in combination, web-finishing means; longitudinal cutting means for subdividing said web longitudinally; means for transversely cutting the resulting longitudinal portions of said web to divide them into flat sheets; means for drawing said web under tension from said finishing means past said longitudnal cutting means; and mechanism for stacking the flat sheets.

33. An apparatus of the class described comprising, in combination, web-finishing means; longitudnal cutting means for subdividing said web longitudinally; means for transversely cutting the resulting longitudinal portions of said web to divide them into flat sheets; means for drawing said web under tension from said finishing means past said longitudinal cutting means; and mechanism for stacking the flat sheets in piles of limited size without stopping said cutting means.

34. An apparatus of the class described comprising, in combination, web-finishing means; longitudinal cutting means for subdividing said web longitudinally; means for transversely cutting the resulting longitudinal portions of said web to divide them into flat sheets; means for drawing said web under tension from said finishing means past said longitudinal cutting means; and means for varying the speed of said transverse cutting means with respect to the speed of said web.

In testimony whereof, we have signed our names to this specification.

CHARLES C. COLBERT.
GEORGE E. PRESTON.